Feb. 18, 1964  R. J. MATT  3,121,474
ZERO GRAVITY LUBRICATION SYSTEM
Filed Oct. 18, 1961
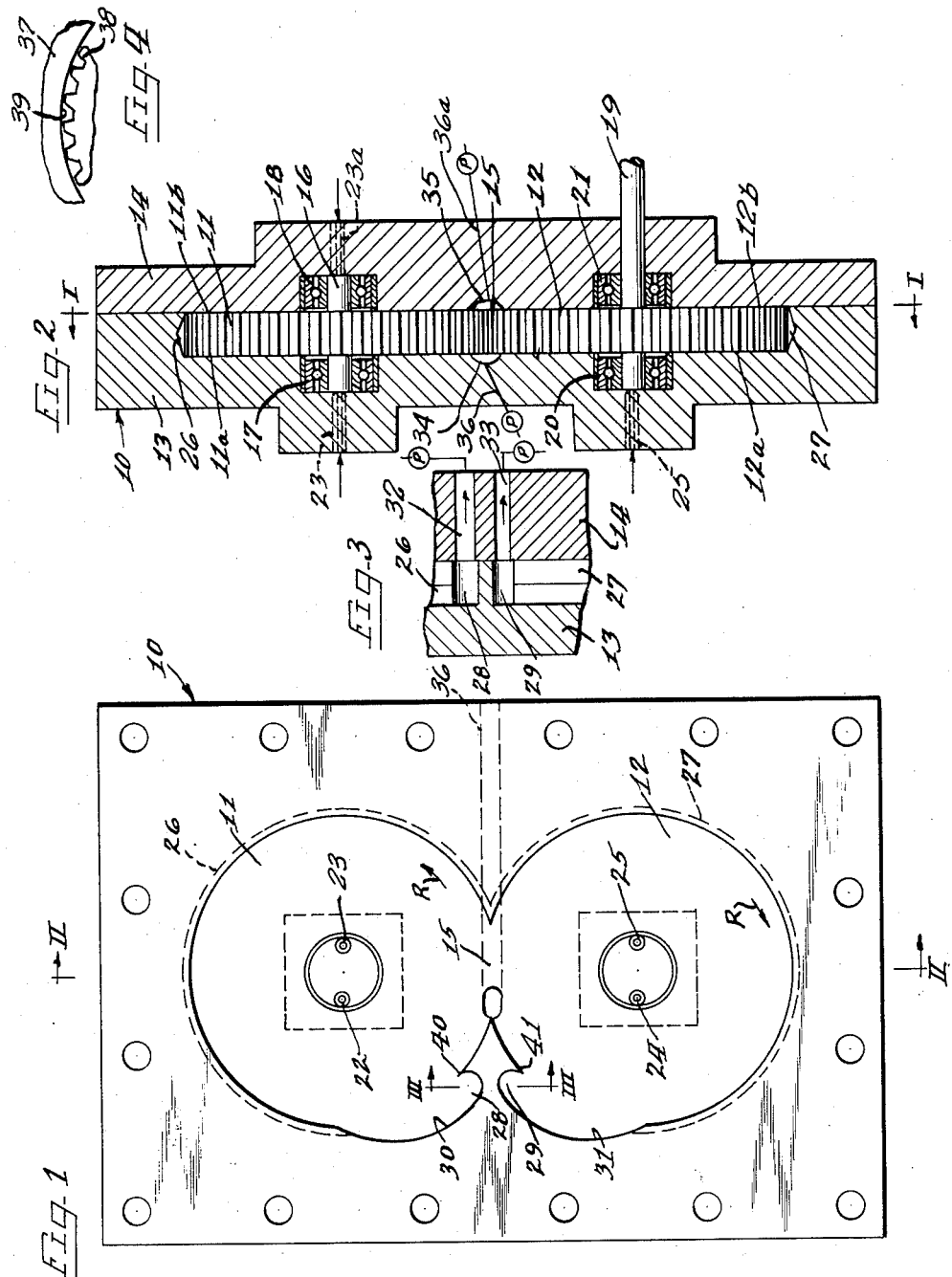
INVENTOR.
Richard J. Matt
BY
ATTORNEYS 3,121,474
ZERO GRAVITY LUBRICATION SYSTEM
Richard J. Matt, South Euclid, Ohio, assignor to Thompson Ramo Wooldridge Inc., Cleveland, Ohio, a corporation of Ohio
Filed Oct. 18, 1961, Ser. No. 145,905
9 Claims. (Cl. 184—6)

The present invention relates to improvements in lubricating systems and particularly to an improved gearbox with a lubricating fluid transfer system suitable for use at zero gravity conditions.

The capability for establishing useful commercial, scientific and military satellites and for exploring the solar system, will depend upon power for communications, control, guidance, and propulsion of the satellite and space vehicles. To satisfy the power requirements of large space vehicles, dynamic systems capable of operating in full gravity, reduced gravity and zero gravity environments must be employed, and continued lubrication is essential to proper operation of the systems. The behavior of fluid lubricants varies in gravity and zero gravity conditions and effects on the fluids such as boiling, heat, transfer, and problems of fluid transport must be accommodated. It is essential that a lubrication system be of complete and maximum reliability, be light in weight and inexpensive. The lubrication system must provide a continual supply of lubricant to the moving surfaces, and must perform a cooling effect.

The problems of heat transfer for cooling have been established in gravitational fields but at conditions of zero gravity the factors are changed. The boiling of the liquid lubricant influences its effectiveness, and the wettability of heated surfaces will influence the rate of boiling of the liquid in contact with the surface and will also influence the size and shape of bubbles which will in turn, affect the heat transfer. There are two possible modes of boiling, nucleate or bubble boiling, and film boiling. The normal condition is to have nucleate boiling with transition to film boiling occurring at high heat transfer rates. However, under conditions of zero gravity, depending upon the fluids and the surface adhesion and cohesion, boiling will occur immediately when the cohesive force of the liquid is greater than the adhesive force between the film and the heated surface. Even when the cohesive force is less than the force of adhesion, the translation to film boiling should occur at a very low rate of heat transfer. A given container and fluid therefore will change from nucleate to film boiling at a small change in temperature for a zero gravity state. Even though the temperature situation in a vehicle is not extremely high, this boiling and heat transfer phenomenon must be taken into consideration because the unit may operate in a vacuum.

In states of partial and zero gravity, standard methods of fluid movement cannot be followed with a guarantee that the fluid will be present at the inlet to pumps or controls at the proper time. Also, the conventional method of venting cannot be used because the top or surface of the fluid or gas phase cannot be conveniently located while the fluid is in the state of zero gravity.

It is accordingly an object of the present invention to provide a lubrication system having a positive expulsion or positive fluid transporting method for positively moving the fluid lubricant and maintaining it in proper contact with the surfaces for efficient and effective lubrication and heat transfer.

A further object of the invention is to provide a zero gravity lubrication system obtaining better control of lubricating fluid thus preventing vapor lock and preventing suspended liquid from stagnating in a dead corner of the lubrication system such as in the gearbox of the arrangement.

A feature of the invention is the provision of a lubricating system removing the lubricant as quickly as possible after it has left the area requiring lubrication to avoid flooding engagement area of the gears or bearings and the additional frictional drag caused by components running submerged in oil.

Other features, objects and advantages will become more apparent with the teaching of the principles of the invention in connection with the disclosure of the preferred embodiment thereof in the specification, claims and drawings, in which:

FIGURE 1 is a vertical sectional view taken through a gear housing substantially along line I—I of FIGURE 2;

FIGURE 2 is a vertical sectional view taken substantially along line II—II of FIGURE 1;

FIGURE 3 is a sectional view taken substantially along line III—III of FIGURE 1; and FIGURE 4 is a fragmentary sectional view through a gear housing showing a modified arrangement.

As shown on the drawings:

FIGURES 1, 2 and 3 show a gear casing or housing 10 with meshing gears 11 and 12 mounted therein. The housing is illustrated as formed in a first part 13 and a second part 14 with the parts suitably secured to each other such as by being clamped together by bolts. The gears are in mesh at a meshing point 15.

A gear 11 is supported on a shaft 16 carried in bearings 17 and 18 within the housing. A gear 12 is shown as supported on a driving shaft 19 supported in bearings 20 and 21 in the housing.

The bearings are provided with lubrication by lubricating fluid being delivered to orifices or jets such as shown at 22 and 23 for the bearing 17, with the jets being spaced 180° apart. This provides for efficient cooling and lubrication, and prevents damage in the event one of the jets should become stopped or clogged. The bearing 18 at the other side of the gear is similarly lubricated such as illustrated by the jet 23a. The bearing 20 is also lubricated by jets 24 and 25 and similar jets are provided for the bearing 21. Lubricating fluid is supplied under pressure to force lubricant into the housing 10 and preferably a recirculating continuous system is employed which is filled with fluid and provides for positive delivery of lubricant under all conditions of operation including zero gravity operation.

A feature of the arrangement provides for immediate and rapid removal of the lubricating fluid as soon as it has lubricated the bearings to prevent the parts from running in oil and increasing the frictional drag and in turn creating excessive heat. The gear housing 10 is constructed so as to be close fitting to the gears with a minimum surface area for the collection of oil vapor. The side radial faces 11a and 11b of the gear 11, and the faces 12a and 12b of the gear 12 are in close running proximity to the inner surfaces of the housing 10 to aid in the centrifugal transfer of lubricant outwardly as the gears rotate. Large surface areas are avoided which would tend to collect lubricant and pockets are avoided wherein the lubricant could become stagnant. Pockets of lubricating fluid if permitted to gather could cause a blob of lubricant to suddenly surge into a group of gears or bearings due to sudden movement of the vehicle and which the gears are used in space, and result in flooding them out causing possible failure or loss of power.

Around the periphery of the gears are peripherally extending plenum chambers 26 and 27. Various shapes may be employed but an advantageous shape is V-shaped or triangular as illustrated. The lubricant comes off the tip of the gears to collect in the plenum chambers 26 and 27 and is carried circumferentially therealong in the direction of rotation of the gears as indicated by the arrows R.

In an alternative arrangement, as illustrated in FIGURE 4, the gear 38 may be arranged in close proximity to the housing 37 with the inner surface 39 of the housing being close to the outer tips of the gear teeth so that the lubricant will be trapped between the teeth of the gears to be carried forwardly.

A collection scavenge chamber is provided to receive lubricant from the plenum chamber, and tear-drop shaped collection chambers 28 and 29 are provided with outwardly tapering walls 30 and 31.

It is desirable to have at least one tear-drop scavenge or collection chamber for each gear and the most desirable location is to position it before the point of mesh 15. This collects a maximum amount of lubricant from the gear before the lubricant can go into the gear mesh. This reduces the spreading forces and the load on the gears and reduces some of the mechanical action on the gear and lubricant.

A separate scavenge suction line 32, 33, FIGURE 3, is provided for each of the scavenge collection chambers 28 and 29. Separate suction lines encourage reliability and efficiency and if several scavenge chambers are joined together it is possible for one line to pull air while the other lines are filled with lubricant. The line that is sucking air suddenly destroys the suction of the pump and the unit then cannot remove oil from the other chambers. This has a tendency to "slug" or pull air bubbles through the line. A pressure balance must be maintained in the system. Separate suitable pumping units shown at P are provided for drawing the lubricant through the lines 32 and 33, and these pumping units and the closed circuit need not be shown in detail and will be appreciated by those skilled in the art. The circuit may also be provided with vapor traps and vapor separating means to remove gas from the circuit and insure the solid flow of lubricating fluid, to be returned to the bearings.

Side scavenge chambers 34 and 35 located at each side of the gears at the gear mesh. Passages such as shown at 36 and 36a lead from each of the side scavenge chambers and are connected to the circuit for removing the lubricant, and each are provided with separate pumping units P, preventing one line from drawing vapor to lose suction in the other as would occur if they were interconnected.

The outer plenum chambers 26 and 27 do not extend for 360° around the gear but run from the outgoing side of the mesh to the tear-drop collection plenum chambers 30 and 31. The areas 40 and 41 are void of any circumferential plenum to provide in effect a pick-up scoop, provided by the surfaces 40 and 41 in the back wall of the collection chambers 28 and 29. The scoops are efficient in removing oil from the periphery of the gear.

In operation, lubricant is jetted in to the bearings through dual jet openings such as 22 and 23 and 24 and 25. The oil passes outwardly by centrifugal force along the outer surfaces of the gears 11 and 12 and the gears may be provided with slingers to aid in the outward transfer of the lubricant. The lubricant is then carried along the outer plenum chambers 26 and 27 to be captured in the tear-drop shaped collection scavenge chambers 28 and 29 and separated from the outer surface of the gears by the scoops 40 and 41. Lubricant squirted out at the mesh of the gears is collected by the side scavenge chambers 34 and 35.

Thus it will be seen that I have provided an improved structure for the positive lubrication of surfaces and the positive transfer of the lubricant through a gearbox capable of use at zero gravity conditions, and which meets the objectives and advantages above set forth. The mechanism provides for separate scavenge lines and improved surface arrangements for the collection and removal of the lubricating fluid.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. In a gearbox, a lubrication transfer system capable of the transferal of lubricant under conditions of zero gravity comprising a gear housing having a gear chamber therein, meshing gears rotatably mounted in the chamber, passage means for delivering lubricating fluid to the chamber, peripheral plenum chambers formed in said housing radially outwardly of each of the gears facing radially inwardly with the lubricating fluid moving through the chambers in the direction of movement of the gears, and means at the ends of said chambers for collecting lubricating fluid.

2. A gear assembly with a lubrication transfer system for the transferal of lubricant under conditions of zero gravity comprising a gear housing having a gear chamber therein, meshing gears rotatably mounted in the chamber, passage means for delivering lubricating fluid to the chamber, peripherally extending V-shaped channels formed in the housing radially outwardly of the gears and opening inwardly to the gear teeth with the lubricating fluid moving through the channels in the direction of movement of the gears, and means at the ends of said channels for collecting the lubricating fluid.

3. A gear assembly comprising a gear housing having a gear chamber therein, meshing gears rotatably mounted in the chamber, passage means for delivering lubricating fluid to the chamber, a pair of separate lubricant collecting scavenge chambers each exposed radially to the teeth of one of the meshing gears ahead of the meshing point of the gears, and passages leading from said collecting chambers for the removal of lubricating fluid.

4. In a gearbox having a lubrication transfer system the transferal of lubricant under conditions of zero gravity, a gear housing having a gear chamber therein, meshing gears rotatably mounted in the chamber, passage means for delivering lubricating fluid to the chamber, a pair of separate lubricant collecting scavenge chambers each exposed radially to the teeth of one of the meshing gears ahead of the meshing point of the gears, said collecting chambers having a tear-drop shape with a radial outer lead-in surface terminating in a bulging chamber, and passages leading from said collecting chambers for removal of lubricant.

5. A gear assembly with a lubrication circulating system for the transferal of lubricant under conditions of zero gravity comprising a gear housing having a gear chamber therein, meshing gears in the chamber rotatably mounted on bearings with the walls of the chamber being spaced close to the radial faces of the gears for carrying lubricant outwardly, means for delivering lubricating fluid to the bearings to flow outwardly along the gear faces, peripheral plenum chambers formed in said housing radially outwardly of each of the gears facing inwardly so that the gears will carry the lubricating fluid through the chambers, a pair of lubricant collecting chambers positioned at the ends of said plenum chambers before the mesh of the gears, and passages leading from the collecting chambers for the removal of lubricating fluid.

6. A gear assembly comprising a gear housing having a gear chamber therein, meshing gears rotatably mounted in the chamber, passage means for delivering lubricating fluid to the chamber, scavenge chambers at each side of said gears at the mesh thereof for the removal of lubricant forced out at the mesh, and passage means leading away from the chambers to externally of the housing for the removal of lubricant forced into said chambers.

7. A gear assembly with a lubrication transfer system comprising a gear housing having a gear chamber therein, meshing gears in the chamber rotatably mounted on bearings with the walls of the chamber being spaced close to the radial faces of the gears for carrying lubricant outwardly, lubricant collecting scavenge chambers positioned ahead of the meshing point of the gears, side scavenge chambers at each side of said gears at the mesh thereof for the removal of lubricant forced out of the mesh, and passages leading from said side scavenge chambers, said housing extending between the outer surfaces of the gears and having surfaces close to the gear teeth between said collecting and said scavenge chambers.

8. A gear assembly including a lubrication transfer system comprising a gear housing having a gear chamber therein, meshing gears rotatably mounted in the chamber, means for delivering lubricating fluid to the chamber, peripheral plenum chambers formed in said housing radially outwardly of each of the gears facing radially inwardly so that the gears will carry the lubricating fluid through the chambers, and a scoop positioned before the mesh of the gears having a surface in close proximity to the outer surface of the gears with an outwardly extending surface for separating lubricant from the outer edge of the gear teeth.

9. In a gearbox, a lubrication transfer system capable of the transfer of lubricant under conditions of zero gravity comprising, a housing having a gear chamber therein, meshing gears in the housing chamber rotatably supported on bearings and having radial surfaces in close running relationship to the housing walls so that lubricant is carried radially outwardly between said radial surfaces and housing walls, a pair of lubricating fluid delivering orifices for each of said bearings spaced 180° apart, radially inwardly facing passages outwardly of the gears for carrying lubricating fluid in the direction of gear movement outwardly of the circumferential extremities of the gears, and chamber means at the ends of said passages for collecting lubricant flowing through said passages.

References Cited in the file of this patent
UNITED STATES PATENTS

| | | |
|---|---|---|
| 2,147,405 | Horton | Feb. 14, 1939 |
| 2,344,156 | McCormick et al. | Mar. 14, 1944 |
| 2,986,097 | Chrzanowski et al. | May 30, 1961 |

FOREIGN PATENTS

| | | |
|---|---|---|
| 622,873 | Great Britain | May 9, 1949 |